(12) United States Patent
Fujimori

(10) Patent No.: US 11,659,148 B2
(45) Date of Patent: May 23, 2023

(54) METHOD FOR CONTROLLING DISPLAY APPARATUS, AND DISPLAY APPARATUS

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/582,819

(22) Filed: Jan. 24, 2022

(65) Prior Publication Data
US 2022/0239877 A1    Jul. 28, 2022

(30) Foreign Application Priority Data

Jan. 25, 2021   (JP) .............................. JP2021-009359

(51) Int. Cl.
*H04N 9/31* (2006.01)
*G06F 3/04842* (2022.01)
*G09G 5/373* (2006.01)
*G09G 5/391* (2006.01)

(52) U.S. Cl.
CPC ....... *H04N 9/3188* (2013.01); *G06F 3/04842* (2013.01); *G09G 5/373* (2013.01); *G09G 5/391* (2013.01); *H04N 9/312* (2013.01)

(58) Field of Classification Search
CPC .. H04N 9/3188; H04N 9/312; G06F 3/04842; G09G 5/373; G09G 5/391
See application file for complete search history.

(56) References Cited

U.S. PATENT DOCUMENTS

| 2006/0012616 | A1* | 1/2006 | Paek | G09G 3/20 345/698 |
| 2014/0354695 | A1 | 12/2014 | Sakai | |
| 2015/0244423 | A1* | 8/2015 | Fujinaga | H04B 5/0031 455/41.1 |
| 2017/0214895 | A1* | 7/2017 | Fujioka | H04N 9/3147 |

FOREIGN PATENT DOCUMENTS

| JP | 2009-109742 A | 5/2009 |
| JP | 2013-222280 A | 10/2013 |
| WO | 2013/105443 A1 | 7/2013 |

* cited by examiner

*Primary Examiner* — Sahlu Okebato
(74) *Attorney, Agent, or Firm* — Oliff PLC

(57) ABSTRACT

A method for controlling a display apparatus, the method comprising, displaying, in a first mode, a first image based on received image data having first resolution on a display surface at a first display size corresponding to the first resolution, displaying, in a second mode, a second image based on the image data having second resolution smaller than the first resolution on the display surface at a second display size corresponding to the second resolution, converting, when the display apparatus accepts the operation of increasing the second display size in the second mode, the first resolution of image data to third resolution corresponding to the operation, displaying a third image based on the image data having the third resolution on the display surface.

6 Claims, 16 Drawing Sheets

METHOD FOR CONTROLLING DISPLAY APPARATUS, AND DISPLAY APPARATUS

The present application is based on, and claims priority from JP Application Serial Number 2021-009359, filed Jan. 25, 2021, the disclosure of which is hereby incorporated by reference herein in its entirety.

BACKGROUND

1. Technical Field

The present disclosure relates to a method for controlling a display apparatus, and a display apparatus.

2. Related Art

There has been a known display apparatus that detects the position, on a display surface, indicated with a pointing element and displays an image on the display surface based on the detected indicated position.

For example, the apparatus disclosed in JP-A-2013-222280 has an annotation mode and a whiteboard mode. In the annotation mode, the display apparatus receives image data transmitted from an image output apparatus, projects an image based on the image data as a projection image on a projection surface, and draws an object over the projected image. In the whiteboard mode, the display apparatus deletes the projected image and draws an object against a white background.

In the annotation mode, however, the position on and the size of the projection surface on which the projection image is projected are determined in accordance with a single rule, and the position and size of the projected image cannot be readily changed by a user's operation. In the whiteboard mode, the image based on the image data cannot be displayed as a projection image.

SUMMARY

An aspect that solves the problems described above is directed to a method for controlling a display apparatus. The display apparatus has a first mode in which the display apparatus displays an image based on received image data on a display surface at a display size corresponding to the resolution of the image data, and a second mode in which the display apparatus generates converted image data that is the received image data having reduced resolution and displays an image based on the generated converted image data on the display surface at a display size corresponding to the resolution of the converted image data. The method includes, when the display apparatus accepts the operation of increasing the display size of the image displayed on the display surface in the second mode, converting the resolution of the converted image data in such a way that a display size corresponding to the accepted operation is achieved, and displaying an image based on the converted image data after the conversion on the display surface.

Another aspect that solves the problems described above is directed to a display apparatus including a receiver that receives image data, a display section that displays an image on a display surface, a resolution converter that converts the resolution of the image data received by the receiver, an accepting section that accepts an operation, and a controller that causes the display section to display an image based on the image data on the display surface. The controller has a first mode in which the display section displays an image based on the image data received by the receiver on the display surface at a display size corresponding to the resolution of the image data, and a second mode in which the controller generates converted image data that is the image data received by the receiver and having resolution reduced by the resolution converter and the display section displays an image based on the generated converted image data on the display surface at a display size corresponding to the resolution of the converted image data. When the accepting section accepts the operation of increasing the display size of the image displayed on the display surface in the second mode, the controller converts the resolution of the converted image data in such a way that a display size corresponding to the accepted operation is achieved and causes the display section to display an image based on the converted image data after the conversion on the display surface.

DESCRIPTION OF EXEMPLARY EMBODIMENTS

An embodiment according to the present disclosure will be described below with reference to the accompanying drawings.

Figure 1:
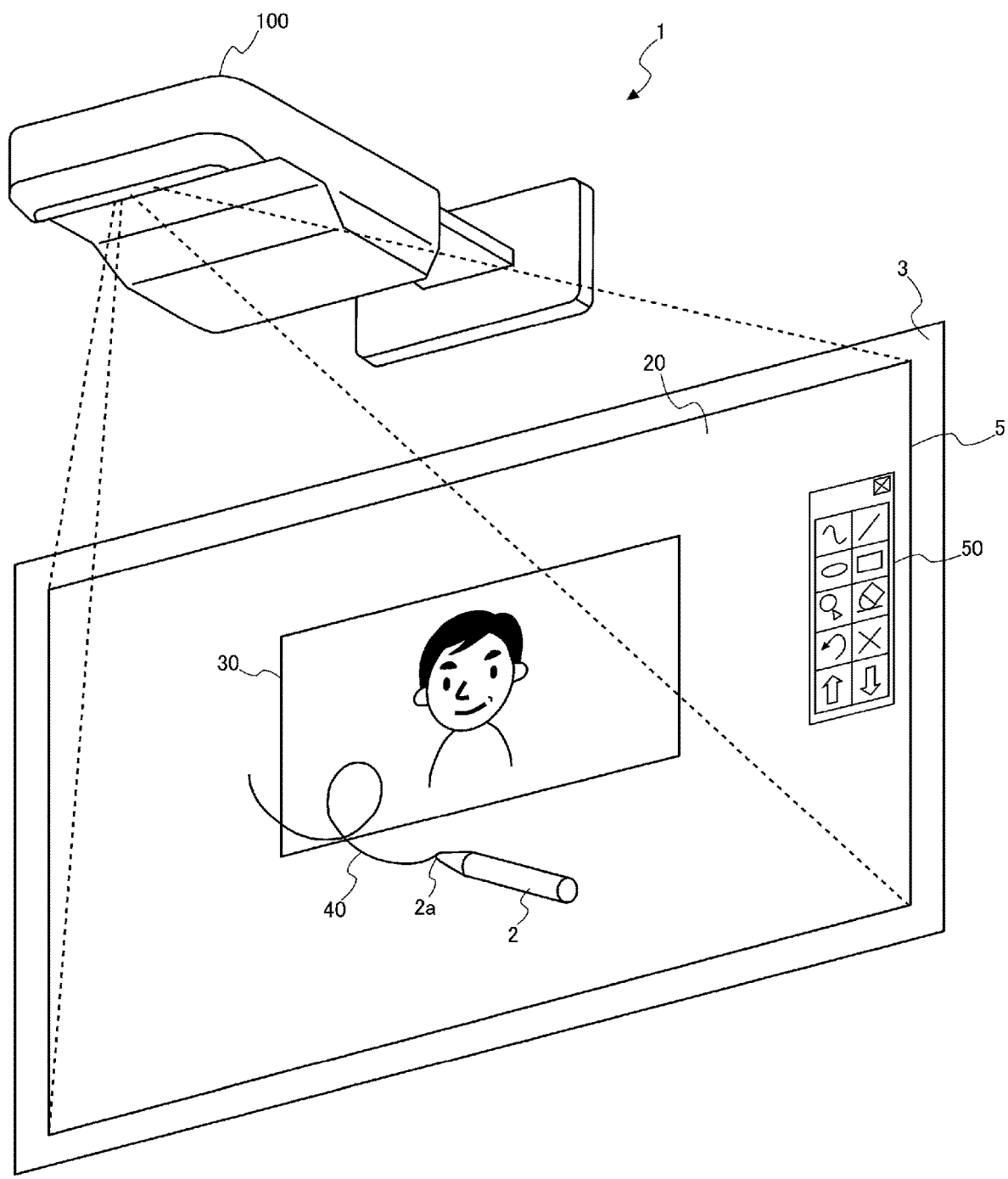
FIG. 1 is a perspective vie showing a schematic configuration of a display system.

FIG. 1 is a perspective vie showing a schematic configuration of a display system 1, which is an embodiment to which the present disclosure is applied.

The display system 1 includes a projector 100 as a display apparatus and a light emitting pen 2 as a pointing element, as shown in FIG. 1. The projector 100 projects image light onto a projection surface 3 as a display surface to display a projection image 20, which is an image corresponding to the image light. The area, of the projection surface 3, where the projector 100 projects the image light is called a projection area 5.

The projection image 20, which is displayed on the projection surface 3 when the projector 100 projects the image light, contains an image based on a video signal supplied from an external image supplier 10 and an image containing a line drawn along the trajectory of the indicated position, on the projection surface 3, indicated with the light emitting pen 2. The image based on the video signal is hereinafter referred to as a video object image 30. The image containing a line drawn along the trajectory of the position indicated with the light emitting pen 2 is hereinafter referred to as a drawn image 40. The projection image 20 contains, for example, an OSD (on screen display) menu image. The OSD menu image is hereinafter referred to as an OSD image 50.

The projector 100 shown in FIG. 1 is fixed to a wall surface and projects the projection image 20 toward the projection surface 3 disposed along the same wall surface. The projection surface 3 can, for example, be a screen or a whiteboard, and an aspect in which the projector 100 projects an image on the wall surface itself may be employable. The aspect of installation of the projector 100 may be an aspect in which a base is disposed in a position separate by a fixed distance from the projection surface 3 and the projector 100 is installed on the base.

The light emitting pen 2 includes a light emitter 2a, which emits infrared light, and a pressure detector that detects the pressure exerted by the tip of the light emitting pen 2 on the projection surface 3, that is, whether the tip is in contact with the projection surface 3. The pressure detector is not shown in the figures. The light emitter 2a repeatedly blinks in a predetermined light emission sequence when the light emitting pen 2 is in operation. The light emitter 2a then changes the light emission sequence in accordance with whether or not the light emitter 2a is in contact with the projection surface 3. The projector 100 can thus identify whether or not the light emitting pen 2 is in contact with the projection surface 3 based on the light emission sequence of the light emitter 2a. The light emitting pen 2 may emit light that belongs to a wavelength band other than that of infrared light.

The projector 100 includes an imager 120. The imaging range of the imager 120 allows capture of an image of a range containing the projection area 5. The projector 100 detects the light emitted by the light emitting pen 2 from the captured image and then detects the position of the detected light as an indicated position indicated by the light emitting pen 2. The projector 100 further senses whether or not a contact has been made with the projection surface 3 based on the light emission sequence of the detected light. Thereafter, the projector 100 can display a pointer that is not shown in the figures in the detected indicated position or display the drawn image 40, which is a line drawn along the trajectory of the indicated position created in the state in which the light emitting pen 2 is in contact with the projection surface 3.

Figure 2:
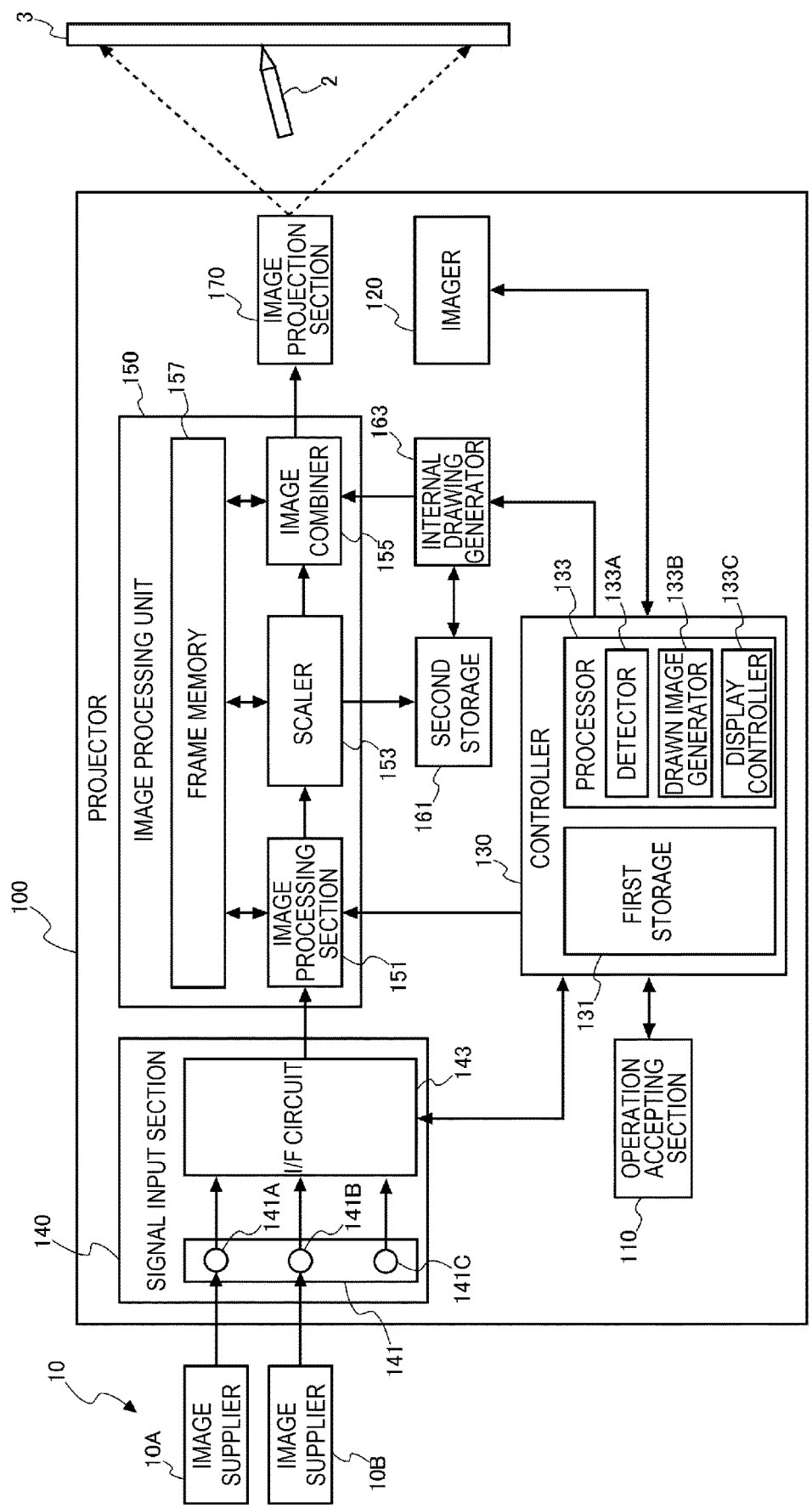
FIG. 2 is a block diagram showing a schematic configuration of the projector.

FIG. 2 is a block diagram showing a schematic configuration of the projector 100.

The schematic configuration of the projector 100 will be described with reference to FIG. 2.

The projector 100 includes an operation accepting section 110, the imager 120, a controller 130, a signal input section 140, an image processing unit 150, a second storage section 161, an internal drawing generator 163, and an image projection section 170.

The operation accepting section 110 includes a plurality of operation keys that allow a user to issue a variety of instructions to the projector 100. The operation keys provided at the operation accepting section 110 include a power key for switching a power-on state to a power-off state and vice versa and a menu key for displaying a menu image for making a variety of settings. The operation keys further include directional keys for selecting an item on the menu image, an input selection key for selecting an image interface to which image information is inputted, and other keys. When the user operates any of the variety of operation keys of the operation accepting section 110, the operation accepting section 110 accepts the operation and outputs an operation signal according to the content of the operation to the controller 130. A remotely operable remote controller that is not shown may be used as the operation accepting section 110. In this case, the remote controller transmits an infrared signal according to the content of the user's operation, and a remote control signal receiver that is not shown in the figures receives the infrared signal. The remote control signal receiver outputs an operation signal corresponding to the content of the operation indicated by the received infrared signal to the controller 130.

The imager 120 is a camera including an imaging device that is not shown, such as a CCD (charge coupled device) sensor and a CMOS (complementary metal oxide semiconductor) sensor. The imager 120 includes an infrared transmitting filter that absorbs visible light and transmits infrared light and captures an image of the infrared light emitted from the light emitting pen 2 via the infrared transmitting filter. The imager 120 repeatedly captures images of the range containing the projection area 5 on the projection surface 3 under the control of the controller 130 and successively outputs the captured images, which are the results of the imaging, to the controller 130.

The controller 130 is a computer apparatus including a first storage 131 and a processor 133. The controller 130, in which the processor 133 operates in accordance with a control program stored in the first storage 131, oversees and controls the action of the projector 100.

The first storage 131 includes a RAM (random access memory), a ROM (read only memory), and other memories. The RAM is used to temporarily store a variety of data and other pieces of information, and the ROM stores the control program, a variety of setting information, and other pieces of information for controlling the action of the projector 100.

The first storage 131 stores calibration data. The calibration data is data that associates the coordinates in the image captured by the imager 120 with the coordinates of in a frame memory 157. A two-dimensional coordinate system is set in each of the captured image and the frame memory 157, and the calibration data uniquely identifies the coordinates in the frame memory 157 that correspond to the coordinates in the captured image.

The processor 133 is a computational processing apparatus formed of a CPU (central processing unit) or an MPU (micro processing unit). The processor 133 executes the control program to control each portion of the projector 100. The processor 133 may be formed of a single processor or a plurality of processors. The processor 133 may be formed of an SoC integrated with part or entirety of the first storage 131 and other circuits. The processor 133 may instead be formed of the combination of a CPU that executes the program and a DSP that performs predetermined computation. Furthermore, the entire functions of the processor 133 may be implemented in hardware or may be achieved by using a programmable device.

The controller 130 of the projector 100 includes a detector 133A, a drawn image generator 133B, and a display controller 133C as functional blocks achieved by the control program. The functional blocks are presented for convenience in the form of blocks of functions achieved by the processor 133 executing the control program.

The detector 133A detects the infrared light emitted by the light emitting pen 2 in the captured image inputted from the imager 120. Out of the infrared light image contained in the captured image, the detector 133A considers an image brighter than or equal to a predetermined threshold and having a size within a predetermined range as the light emitted by the light emitting pen 2 and detects the position of the image as the position indicated with the light emitting pen 2. The detector 133A determines the light emission sequence of the light from the light emitting pen 2 based on captured images acquired over a plurality of times to sense whether or not a contact has been made with the projection surface 3.

The drawn image generator 133B generates the drawn image 40, which is a line drawn along the trajectory of the indicated position, based on the result of the detection performed by the detector 133A. When the user performs a drawing operation of drawing an object on the projection surface 3 with the light emitting pen 2, that is, when the indicated position changes with the light emitting pen 2 being in contact with the projection surface 3, the drawn image generator 133B generates drawing data representing the drawn image 40 based on the trajectory of the indicated position. The drawn image generator 133B generates the drawing data, for example, in a vector format, stores the drawing data in the first storage 131, and successively updates the drawing data over time. The drawn image generator 133B outputs the generated drawing data to the display controller 133C.

The display controller 133C converts the drawing data in a vector format into the drawing data in a raster format and outputs the converted drawing data to the internal drawing generator 163 to display the drawn image 40 generated by the drawn image generator 133B. The control performed by the display controller 133C further includes deleting the displayed drawn image 40 and switching the displayed drawn image 40 to another.

A video signal is inputted to the signal input section 140 from the external image supplier 10, such as a computer and a variety of video instruments. The signal input section 140 includes a plurality of input terminals 141 as an image interface, which is coupled to the image supplier 10, and an interface circuit 143. The present embodiment will be described with reference to a case where the signal input section 140 includes three input terminals 141, input terminals 141A, 141B, and 141C, but the number of input terminals 141 provided in the signal input section 140 is not limited to three. An interface is hereinafter abbreviated to I/F. FIG. 2 shows a case where image suppliers 10A and 10B are coupled to the projector 100. The image supplier 10A corresponds to a first image supplier, and the image supplier 10B corresponds to a second image supplier. The signal input section corresponds to an input interface.

Examples of the input terminals 141A, 141B, and 141C provided in the signal input section 140 may include the following:

HDMI (high definition multimedia interface, HDMI is a registered trademark) terminal to be coupled to video instruments and computers that support HDMI;

a computer terminal to which an analog RGB signal is primarily inputted from a computer; and a video terminal to which a composite signal is primarily inputted from a video instrument.

The I/F circuit 143 extracts image data and sync signals contained in video signals inputted via the input terminals 141A, 141B, and 141C. The I/F circuit 143 outputs the extracted image data and sync signals to the image processing unit 150 and outputs the extracted sync signals to the controller 130. The image processing unit 150 processes the image data on a frame basis in synchronization with the inputted sync signals. The controller 130 controls each portion of the projector 100 in synchronization with the inputted sync signals. The image data may be video data or still image data.

When the projector 100 and the image supplier 10 are coupled to each other via an HDMI cable, the I/F circuit 143 extracts an EDID (extended display identification data) signal contained in an HDMI signal, which is a video signal. The I/F circuit 143 outputs the extracted EDID signal to the controller 130.

The image processing unit 150 includes an image processing section 151, a scaler 153, an image combiner 155, and the frame memory 157.

The image processing section 151 develops in the frame memory 157 the image data inputted from the signal input section 140 and performs a variety of types of processing on the image data developed in the frame memory 157 under the control of the controller 130. For example, the image processing section 151 performs processing on the image data, such as adjustment of the brightness and contrast of the image and adjustment of a color mode of the image data.

The color mode is a mode in which the color tone of an image to be projected on the projection surface 3 is adjusted. For example, the projector 100 has the following color modes: a dynamic mode suitable for viewing in bright environments; a living mode suitable for viewing under dim light; and a theater mode suitable for movie viewing in dark environments.

The controller 130 inputs correction parameters corresponding to the color mode to the image processing section 151. The image processing section 151 uses the inputted correction parameters to perform gamma correction or any other type of correction on the image data developed in the frame memory 157 to adjust the color mode of the image data.

The scaler 153 carries out a scaling process of converting the resolution of the image data developed in the frame memory 157. The scaler 153 corresponds to a resolution converter.

The scaler 153 carries out a reduction process of converting the resolution of the image data developed in the frame memory 157 to reduce the size of the image data when the operation mode of the projector 100 is the whiteboard mode. The image data generated by the reduction process is called converted image data. The scaler 153 causes the second storage 161 to store the generated converted image data.

When the plurality of image suppliers 10A and 10B are coupled to the projector 100, the scaler 153 reduces the resolution of the image data extracted from the video signals supplied from the image suppliers 10A and 10B to generate converted image data. The scaler 153 causes the second storage 161 to store the generated converted image data.

The operation mode of the projector 100 will now be described.

The projector 100 has the following operation modes: an annotation mode that is a first mode; and a whiteboard mode that is a second mode.

The annotation mode is a mode in which the projector 100 displays images based on a video signal at a size set in advance on the projection surface 3 and the user can draw an object with the light emitting pen 2. That is, the annotation mode is a mode in which images are displayed at a display size corresponding to the resolution of the image data contained in the video signal.

The whiteboard mode is a mode in which the projector 100 displays the video object image 30, which is an image based on the video signal, as an object against a white background and the user performs drawing with the light emitting pen 2 to display the drawn image 40 on the projection surface 3. In the whiteboard mode, the user can change the display size and display position of the video object image 30 displayed as an object by operating the light emitting pen 2.

The second storage 161 is formed, for example, of a RAM (random access memory). The second storage 161 stores the converted image data having undergone the reduction process carried out by the scaler 153.

The internal drawing generator 163 includes a GPU (graphics processing unit). The internal drawing generator 163 generates image data on the OSD image 50 to be displayed simultaneously with the image data and acquires the drawing data generated by the controller 130 under the control of the controller 130. The image data on the OSD image 50 is hereinafter referred to as OSD data. The OSD image 50 includes a pointer, a menu image, or any other object displayed at an indicated position. The menu image shows a plurality of displayed icons corresponding to commands executable by the projector 100.

The internal drawing generator 163 has the function of converting the resolution of the converted image data stored in the second storage 161 to change the size of an image to be projected on the projection surface 3. The internal drawing generator 163 corresponds to a resolution converter.

The internal drawing generator 163 converts the resolution of the converted image data to the resolution corresponding to the display size set by the user's operation of the light emitting pen 2. The user can operate the light emitting pen 2 to enlarge or reduce the image displayed on the projection surface 3.

An image displayed on the projection surface 3 based on the converted image data having undergone the reduction process carried out by the scaler 153 is hereinafter referred to as a thumbnail image 60. Thereafter, the internal drawing generator 163 changes the resolution of the converted image data in accordance with the user's instruction and displays an image on the projection surface 3 based on converted image data having undergone the enlargement or reduction. The thus displayed image is called a video object image 30.

The internal drawing generator 163 outputs the OSD data, the drawing data, and the converted image data read from the second storage 161 to the image combiner 155 when the operation mode of the projector 100 is the whiteboard mode. In this process, in accordance with an instruction from the controller 130, the internal drawing generator 163 further outputs coordinate information representing the coordinates in the frame memory 157, in which the OSD data, the drawing data, and the converted image data are developed, to the image combiner 155.

The internal drawing generator 163 outputs the OSD data and the drawing data to the image combiner 155 when the operation mode of the projector 100 is the annotation mode. In this process, in accordance with an instruction from the controller 130, the internal drawing generator 163 outputs coordinate information representing the coordinates in the frame memory 157, in which the OSD data and the drawing data are developed, to the image combiner 155.

When the plurality of image suppliers 10A and 10B are coupled to the projector 100 and supply the projector 100 with video signals, the internal drawing generator 163 reads converted image data corresponding to the image suppliers 10A and 10B. The internal drawing generator 163 outputs the read converted image data along with the OSD data and the drawing data to the image combiner 155.

The image combiner 155 develops at least one of the inputted OSD data, drawing data, and converted image data at the coordinates in the frame memory 157 that are indicated by the coordinate information. Having developed at least one of the OSD data, the drawing data, and the converted image data in the frame memory 157, the image combiner 155 successively reads the data from the frame memory 157 and outputs the read data as image information to the image projection section 170.

Figure 3:
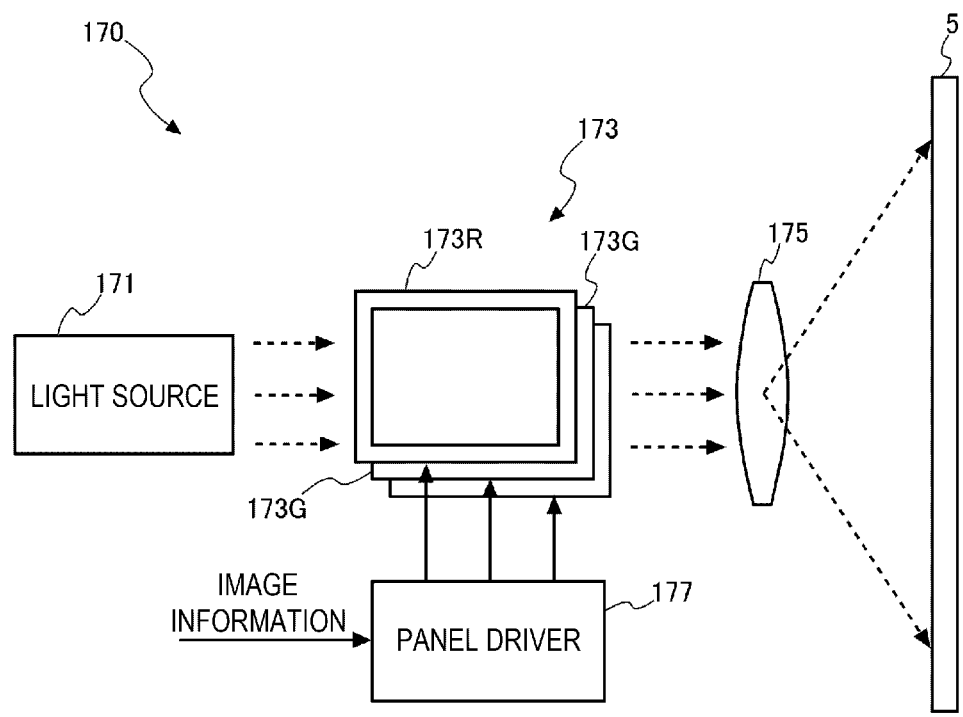
FIG. 3 is a block diagram showing a schematic configuration of an image projection section.

FIG. 3 is a block diagram showing a schematic configuration of the image projection section 170. The image projection section 170 corresponds to a display section.

The image projection section 170 includes a light source 171, three liquid crystal panels 173R, 173G, and 173B as a light modulator 173, an optical unit 175, and a panel driver 177.

The image projection unit 170 modulates the light outputted from the light source 171 to generate image light, and the optical unit 175 enlarges the generated image light and projects the enlarged image light onto the projection surface 3.

The light source 171 includes a discharge-type light source lamp, such as an ultrahigh-pressure mercury lamp and a metal halide lamp, or a solid-state light source, such as a light emitting diode and a semiconductor laser. The light outputted from the light source 171 enters the liquid crystal panels 173R, 173G, and 173B. The liquid crystal panels 173R, 173G, and 173B are each formed, for example, of a transmissive liquid crystal panel including a liquid crystal material encapsulated between a pair of transparent substrates. The liquid crystal panels each have a pixel area formed of a plurality of pixels arranged in a matrix, and a drive voltage is applicable to the liquid crystal material on a pixel basis.

The panel driver 177 applies a drive voltage according to inputted image information to each of the pixels in the pixel areas to set the pixel to have optical transmittance according to the image information. The light outputted from the light source 171 passes through the pixel areas of the liquid crystal panels 173R, 173G, and 173B and is therefore modulated on a pixel basis to form image light fluxes according to the image information on a color light basis. The thus formed R image light, G image light, and B image light are combined with one another on a pixel basis by a light combining system that is not shown into image light representing a color image, and the optical unit 175 enlarges the image light and projects the enlarged image light on the projection surface 3.

Descriptions will next be made of the operation performed by using the light emitting pen 2 and an image projected on the projection surface 3.

In the whiteboard mode, when the image supplier 10 is coupled to the signal input section 140 and the coupled image supplier 10 starts supplying a video signal, the controller 130 causes the scaler 153 to carry out the reduction process of reducing the resolution of the image data contained in the supplied video signal. The scaler 153 causes the second storage 161 to store the converted image data generated in the reduction process.

The controller 130 controls the internal drawing generator 163, the image combiner 155, and the image projection section 170 to display the thumbnail image 60, which is an image based on the converted image data generated by the scaler 153, on the projection surface 3.

Figure 4:
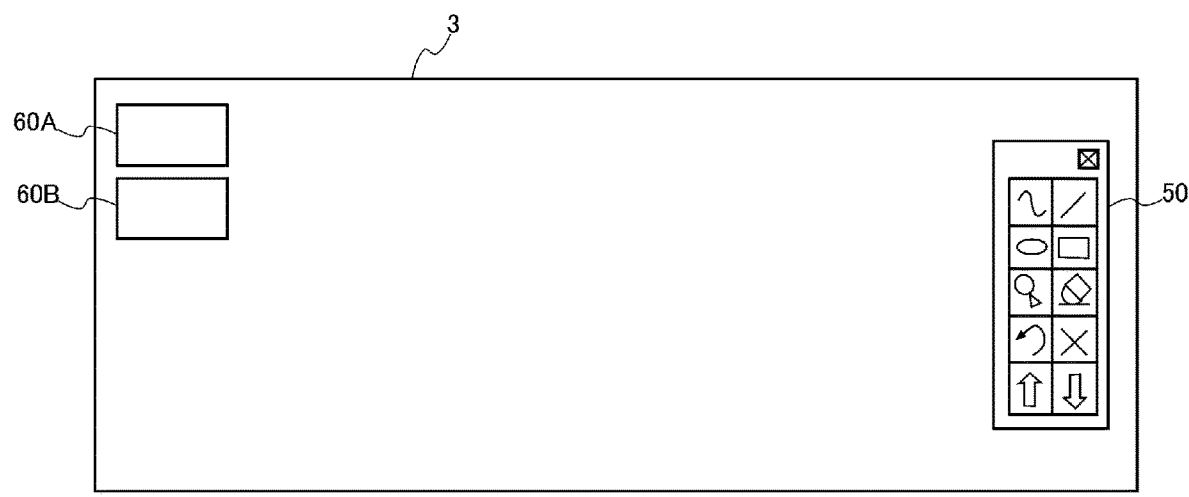
FIG. 4 shows thumbnail images displayed in a reference position.

FIG. 4 shows the thumbnail image 60 displayed in a reference position.

The controller 130 controls the internal drawing generator 163 to display the thumbnail image 60 in the reference position set in advance. The reference position set in advance may be a position, for example, in an upper left area of the projection surface 3. A plurality of reference positions may be set as the reference position set in advance, and priorities may be given to the thus set plurality of reference positions. For example, reference positions may be set at the upper, lower, right, and left four corners of the projection surface 3, and priority may be set for each of the four corner positions. FIG. 4 shows a state in which a thumbnail image 60A based on the video signal supplied from the image supplier 10A and a thumbnail image 60B based on the video signal supplied from the image supplier 10B are displayed on the projection surface 3.

In the case where the projection image 20 has been already displayed in the reference position set in advance on the projection surface 3, the controller 130 may detect an area where the projected image 20 is not projected and display the thumbnail image 60 in the detected area of the projection surface 3. For example, in a case where the video object image 30 has been displayed in the reference position through the user's operation, the thumbnail image 60 to be newly displayed may be displayed so as not to overlap with the video object image 30 already displayed on the projection surface 3.

Figure 5:
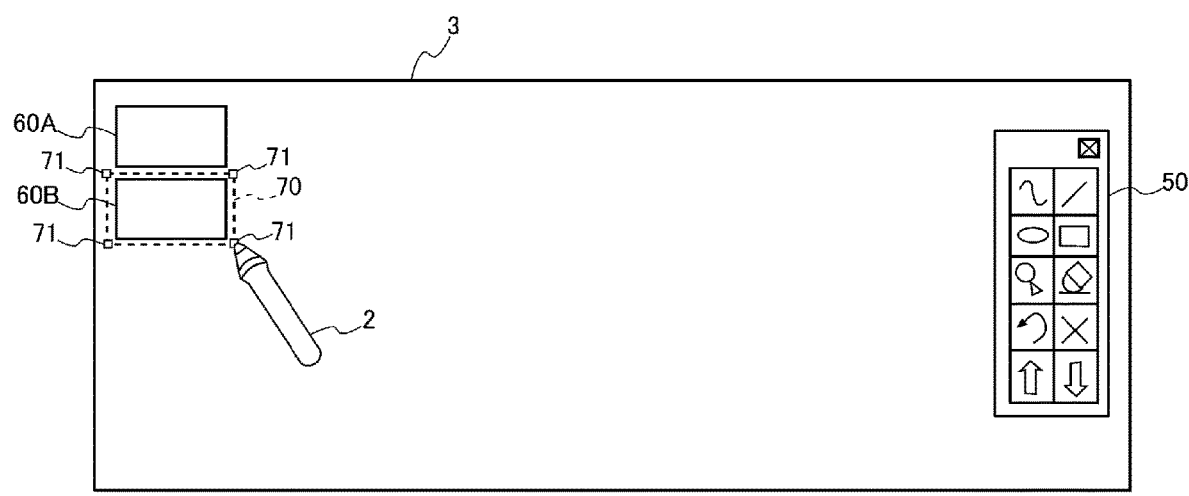
FIG. 5 shows a state in which one of the thumbnail images has been selected.

FIG. 5 shows a state in which one of the thumbnail images has been selected by the user's operation of the light emitting pen 2.

A description will next be made of the actions performed when the projector 100 accepts the operation of selecting the thumbnail image 60 and the operation of enlarging the displayed selected thumbnail image 60 in the state in which the thumbnail image 60 is displayed on the projection surface 3.

The user causes the light emitting pen 2 to come into contact with the position, on the projection surface 3, where the thumbnail image 60 to be selected is displayed. FIG. 5 shows a state in which the thumbnail image 60B has been selected by the user's operation of the light emitting pen 2.

The controller 130 detects the position, on the projection surface 3, with which the light emitting pen 2 has come into contact from the image captured by the imager 120 and identifies the thumbnail image 60B displayed in the detected position on the projection surface 3. The controller 130 displays a rectangular FIG. 70, which surrounds the circumference of the selected thumbnail image 60B. Operators 71, which accept the operation of enlarging or reducing the image and the operation of rotating the image, are displayed at the four corners of the FIG. 70.

For example, the enlargement operation is the operation of causing the light emitting pen 2 to come into contact with the position of one of the operators 71 and moving the light emitting pen 2 in contact with that position to a position outside the thumbnail image 60B. The reduction operation is the operation of causing the light emitting pen 2 to come into contact with the position of one of the operators 71 and moving the light emitting pen 2 in contact with that position to a position inside the thumbnail image 60B.

Figure 6:
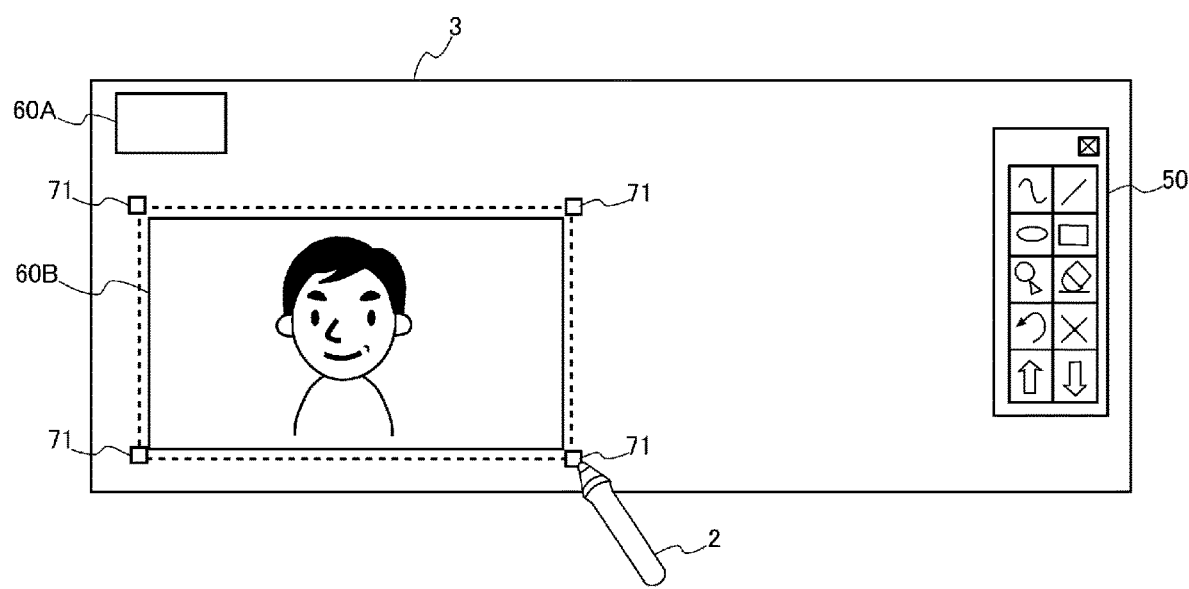
FIG. 6 shows a state in which the thumbnail image is enlarged.

FIG. 6 shows a state in which the thumbnail image 60B is enlarged by the user's operation of the light emitting pen 2.

When the controller 130 accepts the enlargement operation of enlarging the thumbnail image 60B by the user's operation of the light emitting pen 2 on one of the operators 71, the controller 130 presents the converted image data corresponding to the selected thumbnail image 60B and the resolution of the changed converted image data to the internal drawing generator 163.

The internal drawing generator 163 converts the resolution of the converted image data specified by the controller 130 into the resolution specified by the controller 130. The internal drawing generator 163 outputs the converted image data having undergone the resolution conversion along with the OSD data and the drawing data to the image combiner 155.

The image combiner 155 develops the inputted converted image data, OSD data, and drawing data in the frame memory 157, reads the data developed in the frame memory 157, and outputs the read data as the image information to the image projection section 170. The selected thumbnail image 60B is thus enlarged to the display size specified by the user and displayed as the video object image 30 on the projection surface 3.

Also when the controller 130 accepts the operation of enlarging or reducing the displayed video object image 30, the controller 130 presents specified converted image data corresponding to the selected video object image 30 and the resolution of the changed converted image data to the internal drawing generator 163.

The internal drawing generator 163 converts the resolution of the converted image data specified by the controller 130 into the resolution specified by the controller 130. The internal drawing generator 163 outputs the converted image data having undergone the resolution conversion along with the OSD data and the drawing data to the image combiner 155.

The video object image 30 displayed on the projection surface 3 can thus be enlarged or reduced to the size specified by the user.

Figure 7:
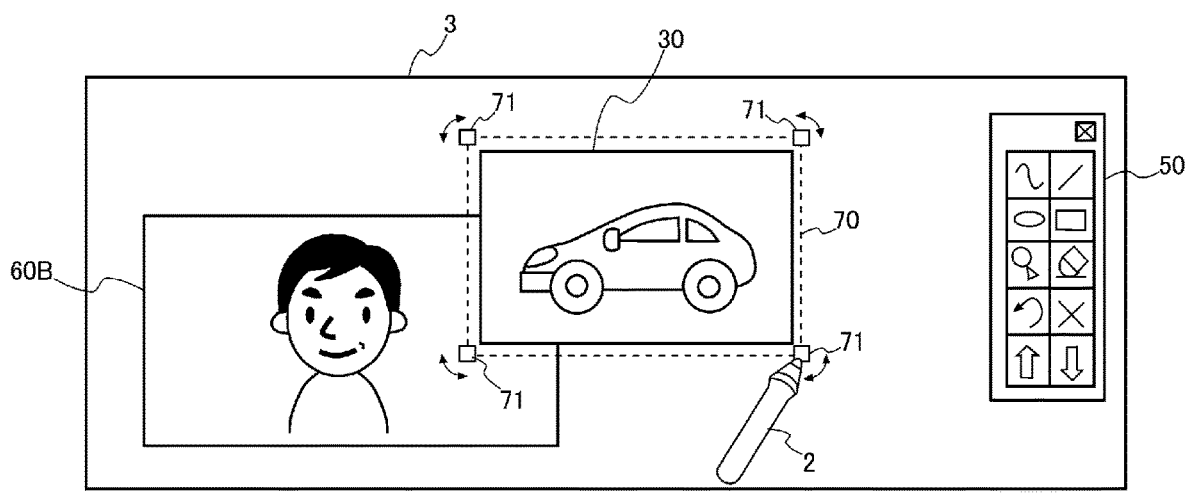
FIG. 7 shows a state in which a video object image has been selected.
Figure 8:
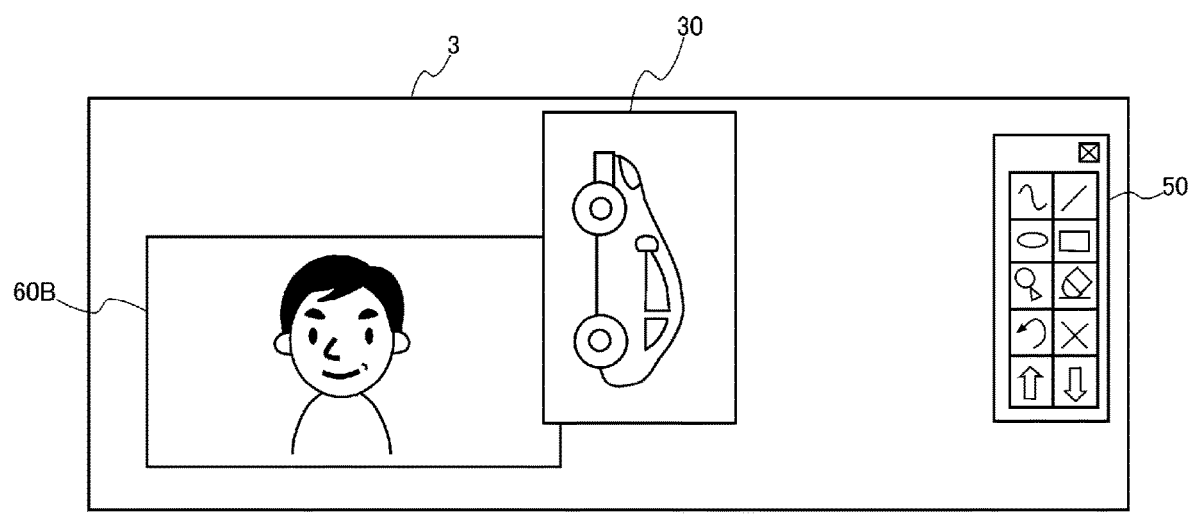
FIG. 8 shows a state in which the video object image has been rotated.

FIG. 7 shows a state in which the video object image 30 has been selected, and FIG. 8 shows a state in which the selected video object image 30 has been rotated.

A description will next be made of the action performed when the projector 100 accepts the operation of rotating the video object image 30 in response to the user's operation of the light emitting pen 2.

The user causes the light emitting pen 2 to come into contact with the position, on the projection surface 3, where the video object image 30 to be selected is displayed.

The controller 130 displays the FIG. 70, which surrounds the circumference of the selected video object image 30. The user then causes the light emitting pen 2 to come into contact with the position of one of the operators 71 and rotates the light emitting pen 2 in contact with the position clockwise or counterclockwise.

When the controller 130 accepts the operation of rotating the video object image 30, the controller 130 presents specification of the converted image data corresponding to the selected video object image 30 and information on the direction of rotation in which and the angle of rotation by which the converted image data is rotated to the internal drawing generator 163.

The internal drawing generator 163 rotates the converted image data specified by the controller 130 in the direction of rotation specified by the controller 130 and by the angle of rotation specified by the controller 130. The internal drawing generator 163 outputs the rotated converted image data along with the OSD data and the drawing data to the image combiner 155.

The video object image 30 displayed on the projection surface 3 can thus be rotated in the direction of rotation specified by the user and by the angle of rotation specified by the user.

A description will next be made of the action performed when the projector 100 accepts the operation of changing the display position of the thumbnail image 60 or the video object image 30 in response to the user's operation of the light emitting pen 2.

The description will be made with reference to the case where the image selected by the user is the video object image 30.

The user causes the light emitting pen 2 to come into contact with the position, on the projection surface 3, where the video object image 30 to be selected is displayed. The controller 130 detects the position, on the projection surface 3, with which the light emitting pen 2 has come into contact from the image captured by the imager 120 and identifies the video object image 30 selected by the user. The controller 130 displays the FIG. 70, which surrounds the circumference of the selected video object image 30. The user then moves the light emitting pen 2 to a position to which the user wants to move the video object image 30 with the light emitting pen 2 remaining in contact with the selected video object image 30.

The controller 130 identifies the direction and amount of movement of the light emitting pen 2 from the captured image and presents specification of the converted image data corresponding to the selected video object image 30 and information on the direction of movement in which and the amount of movement by which the converted image data is moved to the internal drawing generator 163.

The internal drawing generator 163 calculates the coordinates in the frame memory 157 after the movement of the converted image data based on the direction and amount of the movement specified by the controller 130. The internal drawing generator 163 outputs the converted image data specified by the controller 130 and information on the coordinates, in the frame memory 157, where the converted image data is developed to the image combiner 155.

The video object image 30 displayed on the projection surface 3 can thus be moved in the direction of movement specified by the user and by the amount of movement specified by the user.

Figure 9:
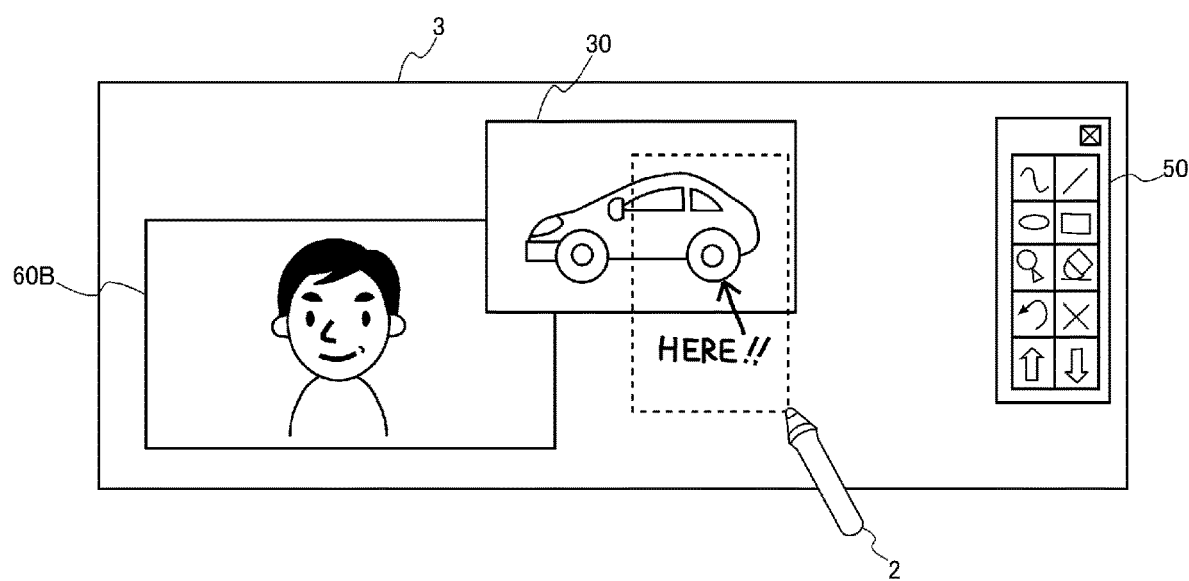
FIG. 9 shows a state in which a range of a projection surface has been selected by a user's operation of a light emitting pen.
Figure 10:
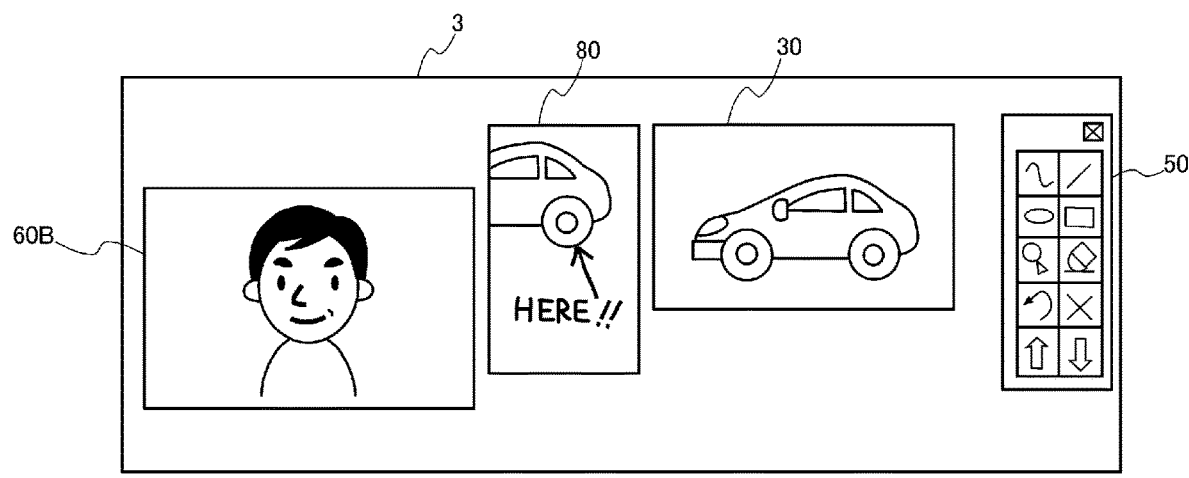
FIG. 10 shows a state in which a captured image is displayed.

FIG. 9 shows a state in which a range of the projection surface 3 has been selected by the user's operation of the light emitting pen 2. FIG. 10 shows a state in which the captured image 80 that is an image of the selected range is displayed.

A description will next be made of the action performed when image capture has been selected by the user's operation of the light emitting pen 2.

For example, assume that a capture command contained in the OSD image 50 is selected and a range of the projection surface 3 is selected by the operation of causing the light emitting pen 2 to come into contact with the projection surface 3 in the state in which the video object image 30 or the drawn image 40 is displayed on the projection surface 3. In this case, the controller 130 outputs information on the range, in the frame memory 157, corresponding to the range of the projection surface 3 selected by the contact operation to the internal drawing generator 163. The internal drawing generator 163 outputs the range information to the image combiner 155 and requests image capture. The image combiner 155 captures image data developed in the area, of the frame memory 157, indicated by the range information and outputs image data as a result of the image capture to the internal drawing generator 163. The internal drawing generator 163 stores the image data inputted from the image combiner 155 as captured image data in the second storage 161.

Having stored the captured image data in the second storage 161, the internal drawing generator 163 reads the converted image data and the captured image data from the second storage 161 and outputs the read data along with the OSD data and the drawing data to the image combiner 155. In this process, the internal drawing generator 163 instructs the image combiner 155 to develop the captured image data at the coordinates, in the frame memory 157, where the converted image data has been developed. The internal drawing generator 163 further instructs the image combiner 155 to develop the converted image data on the right or left of the position where the captured image data has been developed. The image combiner 155 develops the captured image data, the OSD data, and the drawing data in the frame memory 157 in accordance with the instruction from the internal drawing generator 163. The image combiner 155 successively reads the data developed in the frame memory 157 and outputs the read data as the image information to the image projection section 170. The captured image 80 that is an image of the area specified by the user can thus be displayed on the projection surface 3.

A description will next be made of a case where the image supplier 10 stops supplying the video signal.

The controller 130 deletes the video object image 30 displayed on the projection surface 3 from the projection surface 3 when the image supplier 10, which is the source of the video signal, stops supplying the video signal. In this process, when the captured image 80 of the video object image 30 is displayed on the projection surface 3, the displayed captured image 80 is not deleted from the projection surface 3.

A description will next be made of a case where the image supplier 10 resumes supplying the video signal.

When the image supplier 10 is coupled again to the projector 100 and the image supplier 10 resumes supplying the video signal, the controller 130 displays the video object image 30 based on the video signal supplied from the image supplier 10 on the projection surface 3.

In this case, for example, in the case of temporary cable failure or temporary stoppage of the supply of the video signal, the controller 130 evaluates based on the EDID contained in the video signal whether the source of the video signal before the stoppage of the video signal supply coincides with the source of the video signal after the video signal supply is resumed.

When the controller 130 determines that the source of the video signal before the stoppage of the video signal supply coincides with the source of the video signal after the video signal supply is resumed, the controller 130 displays the video object image 30 based on the video signal supplied from the image supplier 10 in the display position before the stoppage.

Priority is given to the video object image 30 projected on the projection surface 3.

The controller 130 may set the priority based on the display size of the projection image 20 on the projection surface 3. When a plurality of video object images 30 are allowed to be displayed so as to overlap with each other, the controller 130 may give higher priority to an upper video object image 30 with respect to the overlapping than the priority given to a lower video object image 30. The controller 130 may also set the priority in accordance with the period having elapsed since the video object image 30 was enlarged, rotated, or otherwise processed by the enlargement, the rotation, or any other operation performed with the light emitting pen 2. That is, higher priority is given to a video object image 30 having been displayed for a shorter period since the video object image 30 was enlarged or rotated.

When the priority given to the video object image 30 is changed, the controller 130 changes the size of the video object image 30 displayed on the projection surface 3 or changes an update frequency for the video object image 30 in accordance with the changed priority. The update frequency is the frequency at which the video object image 30 is updated based on the video signal supplied from the image supplier 10. Increasing the update frequency for a video object image 30 having low priority and receiving a little attention from the user results in unnecessary consumption of the bandwidth of the second storage 161 and an increase in the processing load on the projector 100.

The controller 130 may give the highest priority to the video object image 30 selected by the user's operation of the light emitting pen 2.

When a plurality of video object images 30 are displayed on the projection surface 3 and one of the video object images 30 is selected by the user's operation of the light emitting pen 2, the controller 130 gives the highest priority to the selected video object image 30. The controller 130 gives second highest priority to the video object image 30 to which the highest priority was given before the currently selected video object image 30. In the following description, the controller 130 also changes the priorities given to the other unselected video object images 30 in such a way that the priorities given to the plurality of video object images 30 form consecutive numbers.

The first storage 131 stores setting information on the set update frequencies and display sizes of the video object images 30 on a priority basis.

The controller 130 controls the display size and the update frequency for each of the plurality of video object images 30 by referring to the setting information stored in the first storage 131. That is, the controller 130 controls the internal drawing generator 163 in such a way that the selected video object image 30 is updated at a higher frequency than the other video object images 30. Furthermore, the controller 130 controls the internal drawing generator 163 in such a way that the display size of the selected video object image 30 is greater than those of the other video object images 30.

The update frequency for a video object image 30 may be changed in accordance with the display size of the video object image 30 on the projection surface 3. An image having a larger display size can be updated at a higher frequency and therefore displayed as an image receiving higher attention in the latest state.

Figure 11:
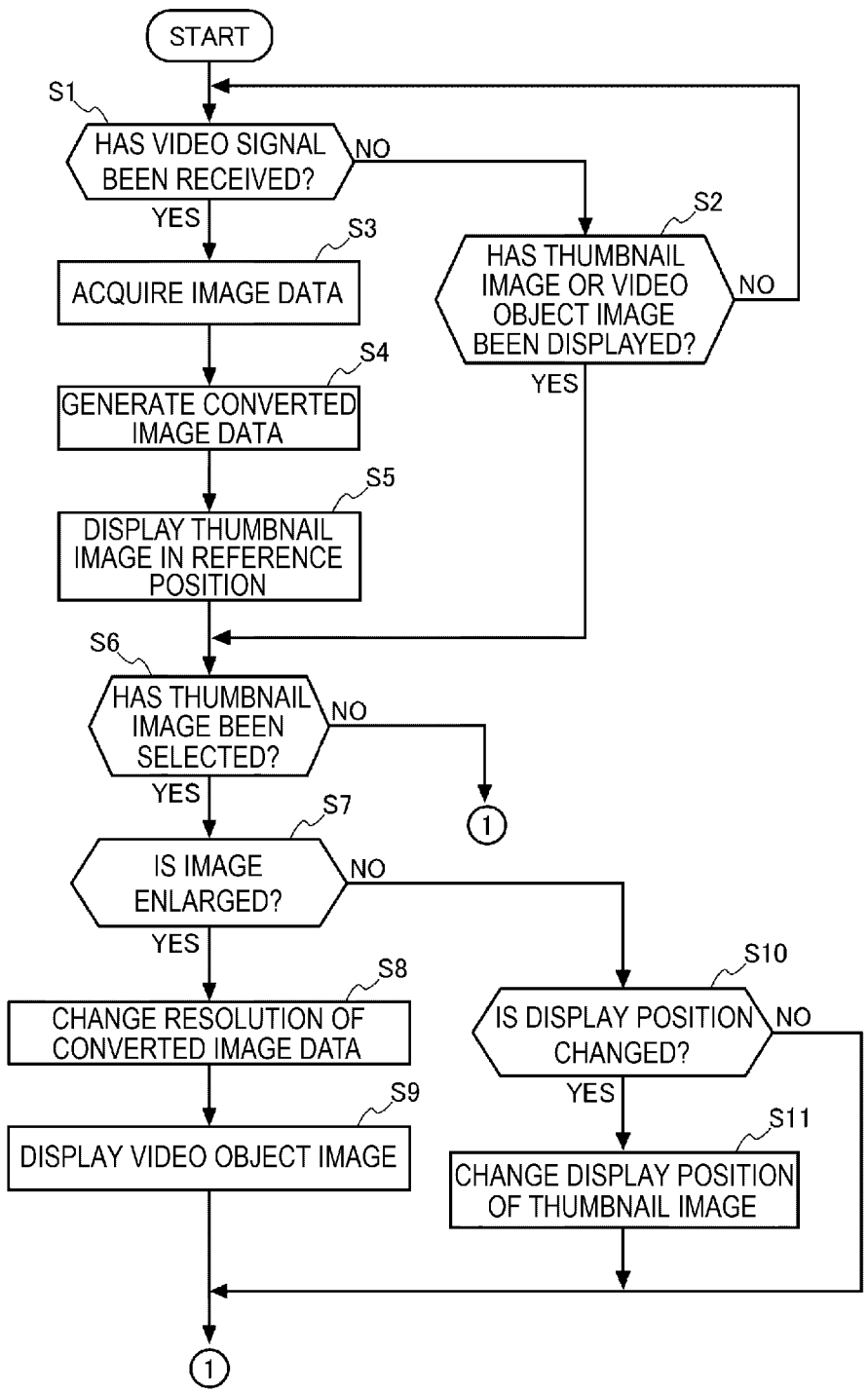
FIG. 11 is a flowchart showing the overall action of the projector.
Figure 12:
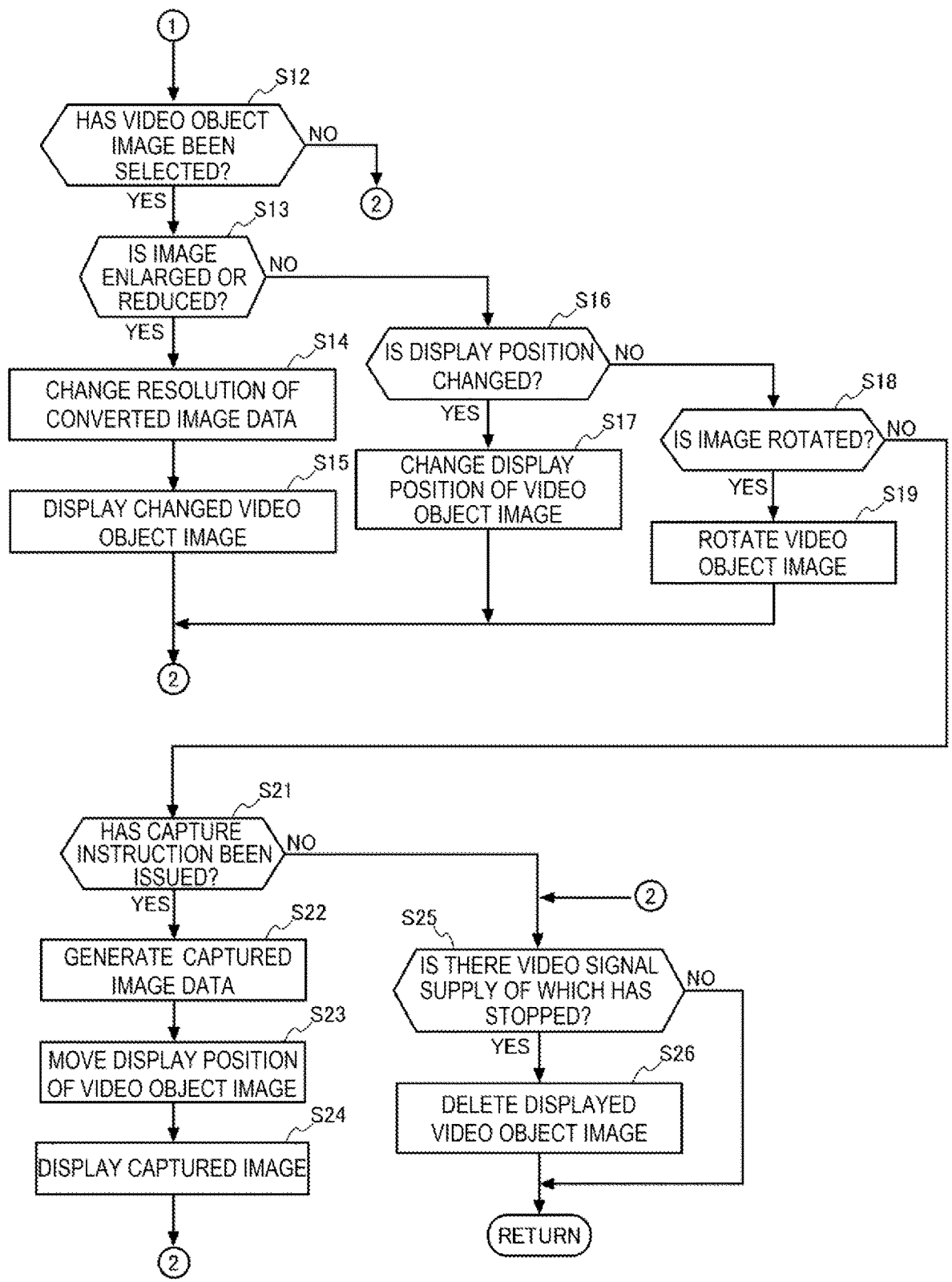
FIG. 12 is a flowchart showing the overall action of the projector.

FIGS. 11 and 12 are flowcharts showing the overall action of the projector 100.

The action of the projector 100 will be described with reference to the flowcharts in FIGS. 11 and 12.

The controller 130 first evaluates whether or not a video signal has been received (step S1). When no video signal has been received (NO in step S1), the controller 130 evaluates whether or not the thumbnail image 60 or the video object image 30 has been projected on the projection surface 3 (step S2). When no thumbnail image 60 or video object image 30 has been displayed on the projection surface 3 (NO in step S2), the controller 130 returns to the evaluation in step S1. When the thumbnail image 60 or the video object image 30 has been displayed on the projection surface 3 (YES in step S2), the controller 130 proceeds to the evaluation in step S6.

When a video signal has been received (YES in step S1), the controller 130 causes the signal input section 140 to acquire image data contained in the video signal (step S3). The signal input section 140 outputs the acquired image data to the image processing unit 150.

The image processing unit 150 performs image processing on the inputted image data to adjust the brightness, contrast, and color mode thereof and then reduces the resolution of the image data through the reduction process to generate converted image data (step S4).

The controller 130 then controls the internal drawing generator 163, the image combiner 155, and the image projection section 170 to display the thumbnail image 60, which is an image based on the converted image data generated by the image processing unit 150, in a reference position on the projection surface 3 (step S5).

The controller 130 then analyzes the captured image to evaluate whether or not the thumbnail image 60 has been selected by the user's operation of the light emitting pen 2 (step S6). When the thumbnail image 60 has been selected (YES in step S6), the controller 130 evaluates whether or not the enlargement operation of enlarging the thumbnail image 60 has been accepted (step S7).

When the enlargement operation has been accepted (YES in step S7), the controller 130 presents specification of the converted image data corresponding to the selected thumbnail image 60 and the resolution of the changed converted image data to the internal drawing generator 163. The internal drawing generator 163 converts the resolution of the converted image data specified by the controller 130 into the resolution specified by the controller 130 (step S8). Thereafter, the converted image data having undergone the resolution conversion is combined with the OSD data and the drawing data by the image combiner 155 and displayed on the projection surface 3 by the image projection section 170. The video object image 30 enlarged to the size specified by the user is thus displayed on the projection surface 3 (step S9).

When the accepted operation is not the enlargement operation (NO in step S7) but the operation of changing the display position of the thumbnail image 60 (YES in step S10), the controller 130 performs the following operation. That is, the controller 130 identifies the direction and amount of movement of the light emitting pen 2 from the captured image and presents specification of the converted image data corresponding to the selected video object image 30 and information on the direction of movement in which and the amount of movement by which the converted image data is moved to the internal drawing generator 163. The internal drawing generator 163 calculates the coordinates in the frame memory 157 after the movement of the converted image data based on the direction and amount of the movement specified by the controller 130. The internal drawing generator 163 outputs the converted image data specified by the controller 130 and information on the coordinates, in the frame memory 157, where the converted image data is developed to the image combiner 155. The image combiner 155 then develops the converted image data at the coordinates, in the frame memory 157, indicated by the coordinate information specified by the internal drawing generator 163 to change the display position of the thumbnail image 60 displayed on the projection surface 3 (step S11).

Thereafter, when the accepted operation is not the operation of changing the display position of the thumbnail image 60 (NO in step S10), the controller 130 evaluates whether or not the video object image 30 has been selected (step S12). When the video object image 30 has not been selected (NO in step S12), the controller 130 transitions to the evaluation in step S25. When the operation of selecting the video object image 30 has been accepted (YES in step S12), the controller 130 evaluates whether or not the operation of enlarging or reducing the displayed video object image 30 has been accepted (step S13).

When the enlargement or reduction operation has been accepted (YES in step S13), the controller 130 presents specification of the converted image data corresponding to the selected video object image 30 and the resolution of the changed converted image data to the internal drawing generator 163. The resolution of the converted image data is changed by the internal drawing generator 163 to the resolution corresponding to the operation (step S14), and the video object image 30 based on the converted image data having the changed resolution is displayed on the projection surface 3 (step S15).

When the accepted operation is not the enlargement or reduction operation (NO in step S13) but the operation of changing the display position of the video object image 30 (YES in step S16), the controller 130 performs the following operation. That is, the controller 130 presents specification of the converted image data corresponding to the selected video object image 30 and information on the direction of movement in which and the amount of movement by which the converted image data is moved to the internal drawing generator 163. Thereafter, the internal drawing generator 163 presents the coordinates in the frame memory 157 after the movement to the image combiner 155, and the image combiner 155 develops the converted image data at the coordinates, in the frame memory 157, indicated by the coordinate information specified by the internal drawing generator 163. The display position of the video object image 30 displayed on the projection surface 3 is thus changed (step S17).

When the accepted operation is not the operation of changing the display position (NO in step S16) but the operation of rotating the image (YES in step S18), the controller 130 performs the following operation.

The controller 130 presents specification of the converted image data corresponding to the selected video object image 30 and information on the direction of rotation in which and the angle of rotation by which the converted image data is rotated to the internal drawing generator 163. The internal drawing generator 163 then rotates the specified converted image data in the specified direction of rotation and by the specified angle of rotation. The video object image 30 displayed on the projection surface 3 is thus rotated in the specified direction of rotation and by the specified angle of rotation (step S19).

When the accepted operation is not the operation of rotating the image (NO in step S18) but the image capture instruction (YES in step S21), the controller 130 performs the following operation. That is, the controller 130 outputs information on the range, of the frame memory 157, corresponding to the range, of the projection surface 3, selected by the contact operation to the internal drawing generator 163. The internal drawing generator 163 causes the image combiner 155 to capture the image data in the area, of the frame memory 157, corresponding to the range information to generate captured image data (step S22). The image combiner 155 then moves the position, in the frame memory 157, where the converted image data corresponding to the video object image 30 has been developed (step S23). The captured image data is then developed in the position, in the frame memory 157, where the converted image data has been developed. The captured image 80 that is an image of the range specified by the user can thus be displayed on the projection surface 3 (step S24).

When the accepted operation is not the capture instruction (NO in step S21), the controller 130 evaluates whether or not there is a video signal the supply of which has stopped (step S25). When there is a video signal the supply of which has stopped (YES in step S25), the controller 130 deletes the displayed video object image 30 or thumbnail image 60 based on the video signal the supply of which has stopped from the projection surface 3 (step S26) and returns to the evaluation in step S1. When the controller 130 determines that there is no video signal the supply of which has stopped (NO in step S25), the controller 130 returns to the evaluation of step S1.

Figure 13:
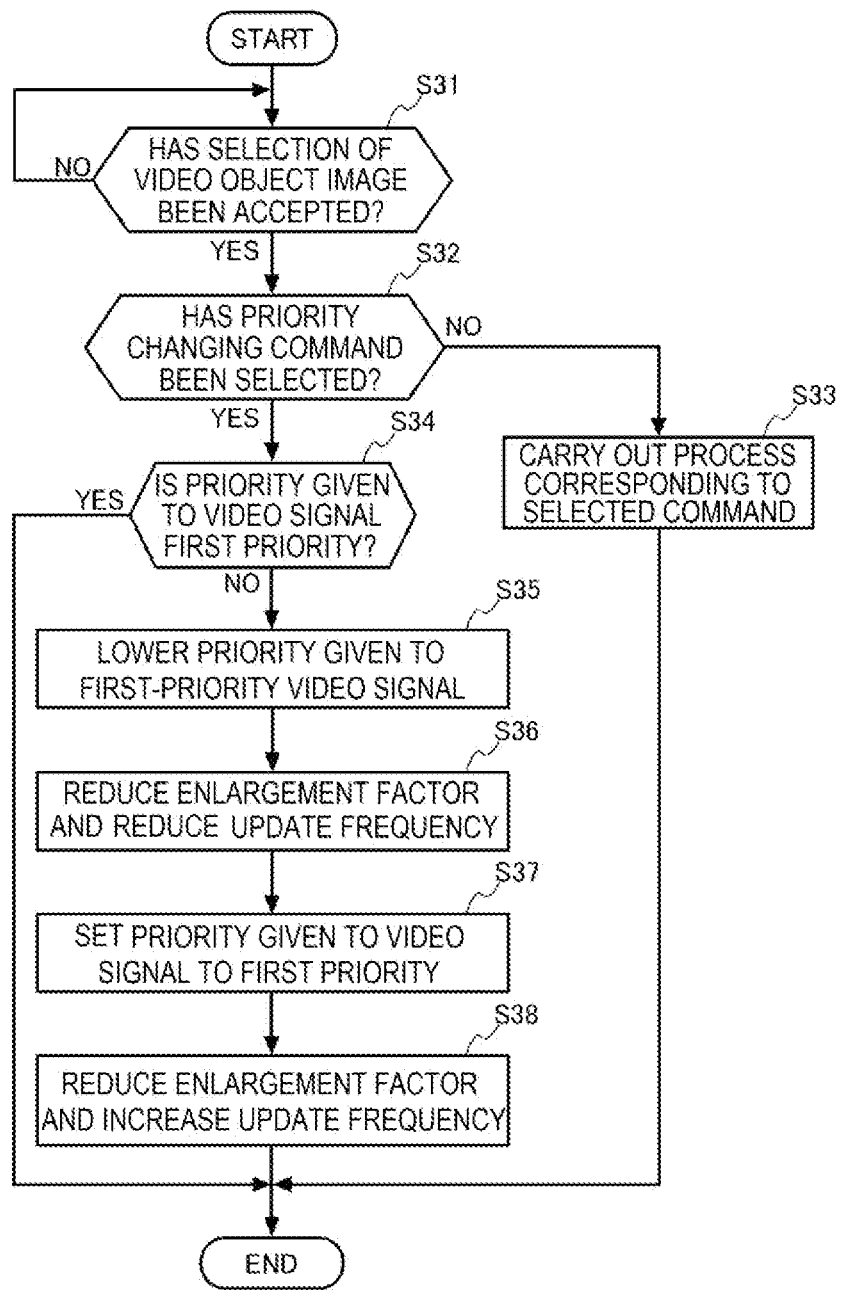
FIG. 13 is a flowchart showing the action of a controller performed when the operation of changing priority given to the video object image has been accepted.

FIG. 13 is a flowchart showing the action of the controller 130 performed when the operation of changing the priority given to the video object image 30 has been accepted.

First, the controller 130 evaluates whether or not the operation of selecting the video object image 30 by the user's operation of the light emitting pen 2 has been accepted (step S31). When the operation of selecting the video object image 30 has not been accepted (NO in step S31), the controller 130 waits for the start of the subsequent processes until the video object image 30 is selected.

When the video object image 30 has been selected (YES in step S31), the controller 130 evaluates whether or not a priority changing command has been selected by the user's operation of the light emitting pen 2 (step S32). When the selected command is not the command to change the priority given to the video object image 30 (NO in step S32), the controller 130 carries out the process corresponding to the selected command (step S33) and terminates the entire processes.

When the command to change the priority given to the video object image 30 has been selected (YES in step S32), the controller 130 evaluates whether or not the priority given to the selected video object image 30 is the first priority (step S34). When the priority given to the selected video object image 30 is the first priority (YES in step S34), the controller 130 terminates the entire processes.

When the priority given to the selected video object image 30 is not the first priority (NO in step S34), the controller 130 changes the priority given to another video object image 30 to which the first priority has been given to the second priority (step S35). The controller 130 also changes the priorities given to the other unselected video object images 30 in such a way that the set priorities form consecutive numbers.

The controller 130 then refers to the setting information stored in the first storage 131, changes the enlargement factor for each of the video object images 30 to which a second or lower priority has been given to a smaller value corresponding to the changed priority, and reduces the update frequency to a value corresponding to the changed priority (step S36).

The controller 130 then sets the priority given to the selected video object image 30 to the first position (step S37). The controller 130 refers to the setting information, changes the enlargement factor for the selected video object image 30 to the enlargement factor corresponding to the changed priority, which is the first priority, and increases the update frequency to a frequency corresponding to the first priority (step S38).

The controller 130 then outputs specification of the converted image data and the corresponding enlargement factor to the internal drawing generator 163. The internal drawing generator 163 carries out the enlargement process of enlarging the converted image data specified by the controller 130 at the enlargement factor specified by the controller 130. The internal drawing generator 163 outputs the processed converted image data and coordinate information on the coordinates, in the frame memory 157, where the converted image data is developed, to the image combiner 155. The image combiner 155 develops the inputted converted image data at the coordinates, in the frame memory 157, indicated by the inputted coordinate information. The image combiner 155 then successively reads the data developed in the frame memory 157 and outputs the read data as the image information to the image projection section 170, so that the image light corresponding to the image information is projected onto the projection surface 3.

Figure 14:
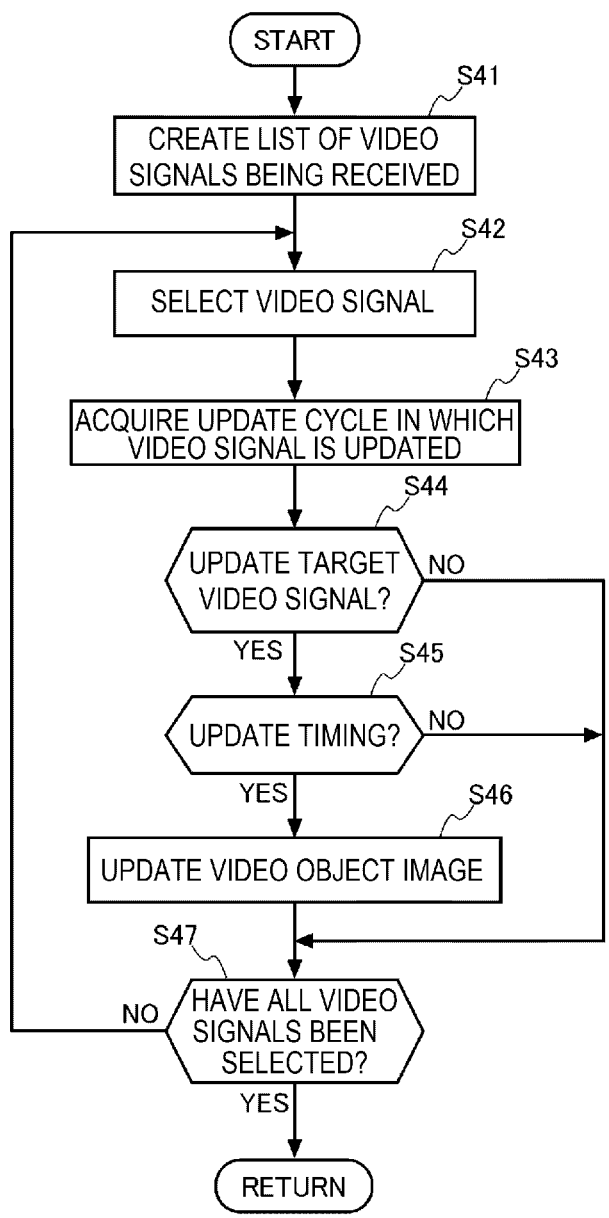
FIG. 14 is a flowchart showing the action of updating the video object image.

FIG. 14 is a flowchart showing the action of updating the video object image 30. The update action of updating a video object image will be described with reference to the flowchart shown in FIG. 14.

First, the controller 130 acquires information on the input terminal 141 that is receiving a video signal out of the input terminals 141 from the signal input section 140 and creates a list of video signals being received (step S41).

The controller 130 then selects one video signal as a target video signal from the created list (step S42). The controller 130 then refers to the setting information, acquires information on the update cycle in which the selected video signal is updated (step S43), and evaluates whether or not the selected video signal is the update target video signal that updates the video object image 30 (step S44).

When the selected video signal is not the update target video signal (NO in step S44), the controller 130 evaluates whether or not all the video signals registered in the list have been selected as the target video signal (step S47). When the controller 130 has selected all the video signals registered in the list as the target video signal, the controller 130 returns to the process in step S41.

When the controller 130 has not selected all the video signals registered in the list as the target video signal (NO in step S47), the controller 130 returns to the process in step S42 to select a target video signal.

When the selected video signal is the update target video signal (YES in step S44), the controller 130 evaluates whether or not the selected video signal reaches the update timing (step S45). When the selected video signal has not reached the update timing (NO in step S45), the controller 130 transitions to step S47 and evaluates whether or not all the video signals registered in the list have been selected as the target video signal.

When the selected video signal has reached the update timing (YES in step S45), the controller 130 updates the video object image 30 that is an image based on the selected video signal. Specifically, the controller 130 notifies the internal drawing generator 163 of the converted image data corresponding to the selected video signal. The internal drawing generator 163 reads the converted image data from the second storage 161 and outputs the read converted image data and information on the coordinates, in the frame memory 157, where the converted image data is developed to the image combiner 155. The image combiner 155 develops the inputted converted image data at the coordinates, in the frame memory 157, indicated by the inputted coordinate information. The image combiner 155 then successively reads the data developed in the frame memory 157 and outputs the read data as the image information to the image projection section 170, so that the image light corresponding to the image information is projected onto the projection surface 3. The video object image 30 corresponding to the selected video signal is thus updated (step S46).

Variation 1

Variations of the embodiment described above will next be described.

Figure 15:
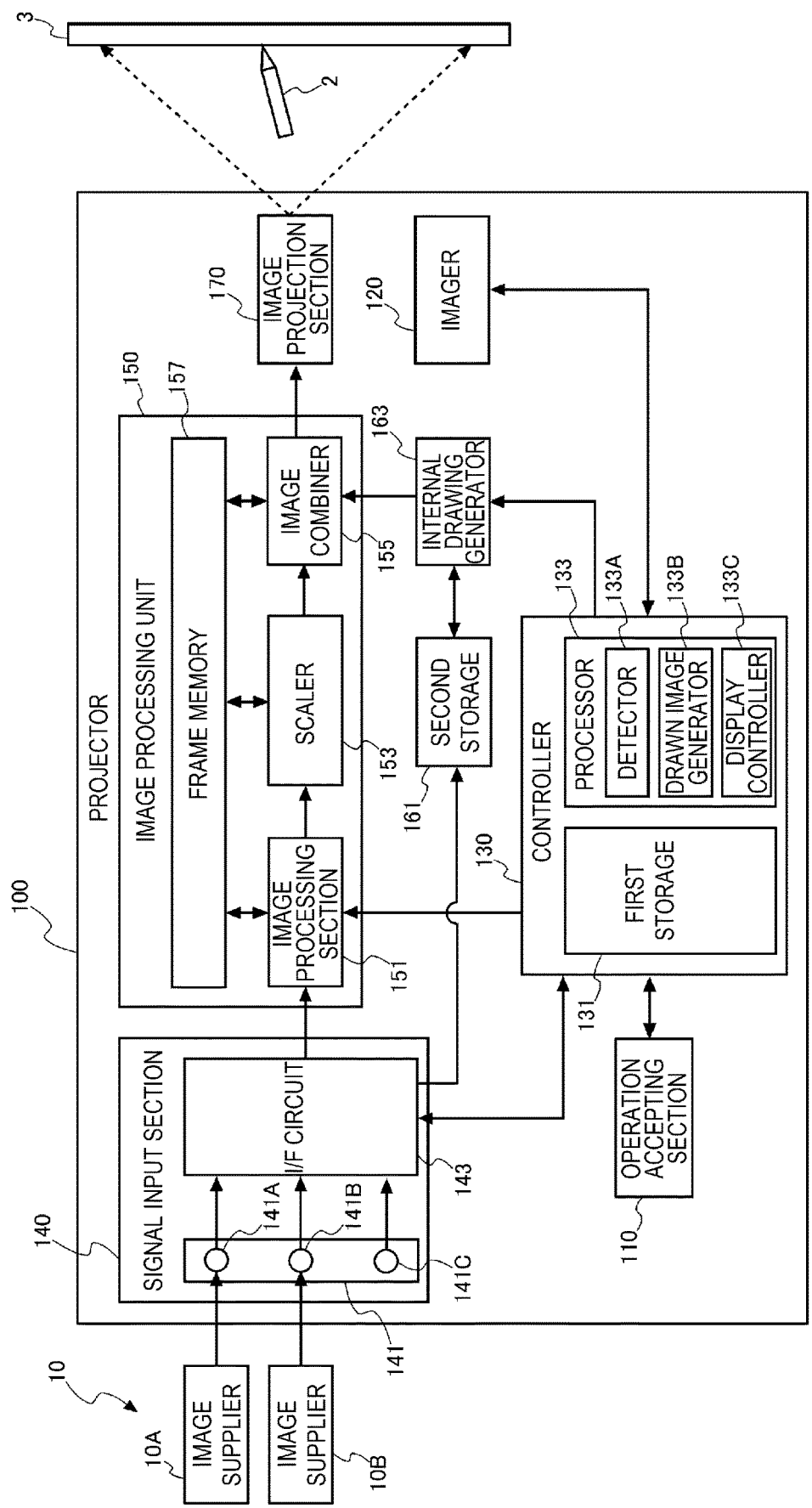
FIG. 15 is a block diagram showing the configuration of the projector according to Variation 1.

FIG. 15 is a block diagram showing the configuration of the projector 100 according to Variation 1.

The projector 100 shown in FIG. 15 is not configured to store the converted image data having been reduced by the scaler 153 in the second storage 161 but to store the image data extracted from the video signal received by the I/F circuit 143 in the second storage 161. That is, the image data to be stored in the second storage 161 is data that has not been reduced by the scaler 153. The internal drawing generator 163 converts the resolution of the image data stored in the second storage 161 to generate converted image data and stores the generated converted image data in the second storage 161.

Variation 2

Figure 16:
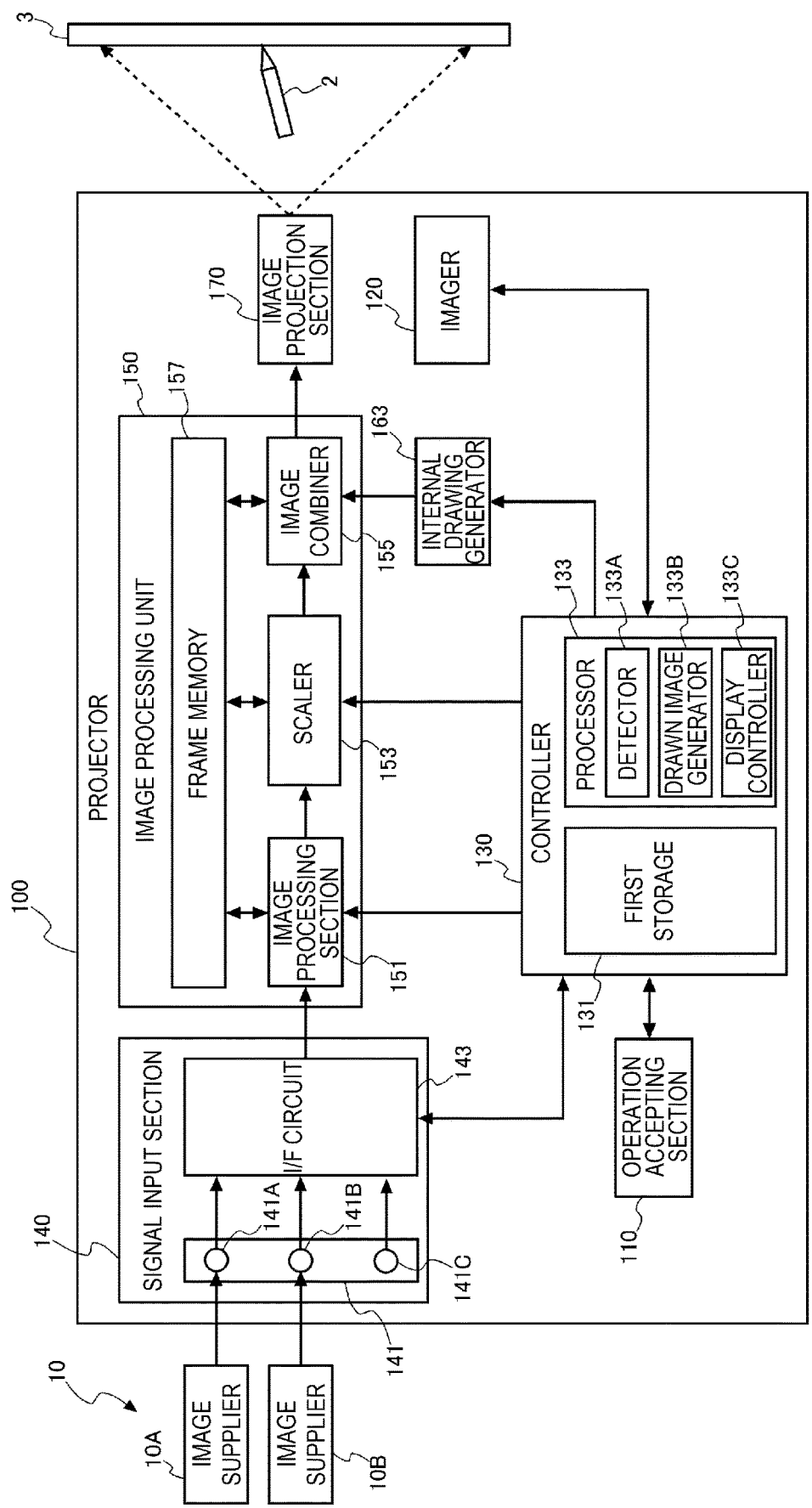
FIG. 16 is a block diagram showing the configuration of the projector according to Variation 2.

FIG. 16 is a block diagram showing the configuration of the projector 100 according to Variation 2. In the embodiment described above, the converted image data having been reduced by the scaler 153 is stored in the second storage 161, and the internal drawing generator 163 converts the resolution of the converted image data into resolution having the display size specified by the controller 130.

In Variation 2, the image data processed by the image processing section 151 is inputted to the scaler 153. The scaler 153 converts the resolution of the inputted image data into the resolution specified by the controller 130. The controller 130 outputs generated drawing data, if any, to the internal drawing generator 163. The controller 130 presents the coordinates, in the frame memory 157, where the image data, OSD data, and drawing data are developed to the internal drawing generator 163. The internal drawing generator 163 outputs the drawing data and OSD data inputted from the controller 130 to the image combiner 155.

The image combiner 155 develops the image data, OSD data, and drawing data at the coordinates, in the frame memory 157, specified by the internal drawing generator 163.

The projector 100 according to the present embodiment has the following operation modes: the annotation mode, which is the first mode; and the whiteboard mode, which is the second mode, as described above.

The annotation mode is a mode in which an image based on received image data is displayed on the projection surface 3 at a display size corresponding to the resolution of the image data.

The whiteboard mode is a mode in which converted image data that is the received image data having reduced resolution is generated and the image projection unit 170 displays an image based on the generated converted image data on the projection surface 3 at a display size corresponding to the resolution of the converted image data.

When the projector 100 receives the operation of increasing the display size of the image displayed on the projection surface 3 in the whiteboard mode, the projector 100 converts the resolution of the converted image data in such a way that the display size corresponding to the accepted operation is achieved. The projector 100 then displays an image based on the converted image data after the conversion on the projection surface 3.

Therefore, when the operation mode of the projector 100 is the whiteboard mode, an image based on received image data can be displayed on the projection surface 3 at a size corresponding to the accepted operation, whereby the convenience of the user can be improved.

Furthermore, the projector 100 updates based on the received image data the image based on the converted image data and displayed on the projection surface 3.

The update frequency for the image based on the converted image data is changed in accordance with the display size, on the projection surface 3, of the image based on the converted image data.

Therefore, since the update frequency for the image based on the converted image data is changed in accordance with the display size, the update frequency can be higher for an image having a larger display size. An image having a large display size and receiving high attention can therefore be displayed in the latest state.

When the projector 100 operates in the whiteboard mode and receives first image data supplied from image supplier 10A and second image data supplied from image supplier 10B, the projector 100 generates first converted image data that is the first image data having reduced resolution and second converted image data that is the second image data having reduced resolution.

The projector 100 displays a first image based on the first converted image data and a second image based on the second converted image data on the projection surface 3.

Images based on image data supplied from the plurality of image suppliers 10A and 10B can therefore be displayed on the projection surface 3.

When the projector 100 accepts the operation of selecting one of the first image and the second image, the projector 100 makes the priority given to the selected image higher than the priority given to the unselected image.

The projector 100 converts the resolutions of the first converted image data and the second converted image data in such a way that the display size of the image having the higher priority is greater than the display size of the image having the lower priority.

The projector 100 processes the first image data and the second image data received by the signal input section 140 in such a way that the update frequency for the image having the higher priority is higher than the update frequency for the image having the lower priority.

Therefore, the priority given to an image selected by the user can be set higher than the priorities given to the other images, the display size is larger than the other images and the update frequency for the image selected by the user can be set higher than the update frequencies for the other images.

The projector 100 deletes the displayed image based on the converted image data from the projection surface 3 when no image data can be received.

When the same image supplier as the source of the image data resumes supplying image data within a period set in advance, the projector 100 displays the image based on the converted image data again in the position where the displayed image was deleted.

Therefore, even when the supply of image data is temporarily stopped, the image can be displayed again in the same position on the projection surface 3.

The embodiment described above is a preferable embodiment of the present disclosure. The present disclosure is, however, not limited to the embodiment described above, and a variety of variations are conceivable to the extent that the variations do not depart from the substance of the present disclosure.

For example, the I/F circuit 143, the image processing unit 150, and the internal drawing generator 163 may be formed, for example, of one or more processors. The I/F circuit 143, the image processing unit 150, and the internal drawing generator 163 may be formed by a dedicated processing apparatus, such as an ASIC (application specific integrated circuit) and an FPGA (field programmable gate array).

In the embodiment described above, light modulation devices provided in the light modulator 173 may each be a transmissive liquid crystal panel or a reflective liquid crystal panel. The light modulation devices may be formed of digital mirror devices or the combination of a digital mirror device and a color wheel. In place of liquid crystal panels or DMDs, a configuration capable of modulating the light outputted from a light source may be employed as the light modulator 173.

The functional portions of the projector 100 shown in FIG. 2 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, in the embodiment described above, part of the functions achieved by software may be achieved by hardware, or part of the functions achieved by hardware may be achieved by software. In addition, the specific detailed configuration of each of the other portions of the projector can be arbitrarily changed to the extent that the change does not depart from the substance of the present disclosure.

The process units in the flowcharts shown in FIGS. 11 to 14 are process units divided in accordance with the contents of primary processes for easy understanding of the processes carried out by the projector 100. How to produce the divided process units or the names of the process units shown in the flowcharts shown in FIGS. 11 to 14 do not limit the present disclosure. The process carried out by the controller 130 can be further divided into a larger number of process units, and each of the process units can be further divided into a large number of processes in accordance with the content of the process. Furthermore, the orders in accordance with which the processes are carried out in the flowcharts described above are not limited to those shown in FIGS. 11 to 14.

In a case where the method for controlling the display apparatus is achieved by a computer incorporated in the projector 100, a program executed by the computer can be configured in the form of a recording medium or a transmission medium that transmits the program. The recording medium can be a magnetic or optical recording medium or a semiconductor memory device. Specific examples of the recording medium may include a flexible disk, an HDD (hard disk drive), a CD-ROM, a DVD, a Blu-ray Disc, a magneto-optical disk, a flash memory, and a portable or immobile recording medium, such as a card-shaped recording medium. The recording medium described above may instead be a RAM, a ROM, an HDD, or any other nonvolatile storage device that is an internal storage device provided in a server apparatus. Blu-ray is a registered trademark.

What is claimed is:

1. A method for controlling a display apparatus, the method comprising:
   displaying, in a first mode, a first image based on received image data having first resolution on a display surface at a first display size corresponding to the first resolution,
   displaying, in a second mode, a second image based on the image data converted to second resolution smaller than the first resolution on the display surface at a second display size corresponding to the second resolution,
   converting, when the display apparatus accepts an operation of increasing the second display size in the second mode, the first resolution of the image data to third resolution corresponding to the operation,
   displaying a third image based on the image data having the third resolution on the display surface, wherein
   the second mode allows a user to use a pen on the display surface, and
the operation of increasing the second display size is provided by the user's action with the pen on the display surface.

2. The method for controlling a display apparatus according to claim 1, further comprising;
   updating the second image based on the image data having the second resolution in the second mode, and
   changing an update frequency of the second image in accordance with the second display size.

3. The method for controlling a display apparatus according to claim 1, further comprising;
   generating, when the display apparatus receives first image data supplied from a first image supplier and second image data supplied from a second image supplier in the second mode, a third image data based on the first image data and a fourth image data based on the second image data, and
   displaying a fourth image based on the third image data and a fifth image based on the fourth image data on the display surface.

4. The method for controlling a display apparatus according to claim 3, further comprising;
   updating, when the display apparatus accepts an operation of selecting the fourth image, a priority of the fourth image to be higher than a priority of the fifth image,
   converting resolution of the fourth image data to be higher than resolution of the fifth image data,
   processing the fourth image data based on an update frequency of the fourth image which is higher than an update frequency of the fifth image, and
   processing the fifth image data based on the update frequency of the fifth image.

5. The method for controlling a display apparatus according to claim 1,
   wherein when receipt of the image data is stopped in the second mode, the display of the second image on the display surface is stopped, and
   when supply of the image data is resumed within a period set in advance after the receipt of the image data is stopped, the second image is displayed again in a position of the second image at the time of stoppage of the display of the second image.

6. A display apparatus comprising:
   an input interface that receives image data having first resolution;
   an operation key or a remote control signal receiver that accepts an operation; and
   processors programed to:
   display, in a first mode, a first image based on the image data at a first display size corresponding to the first resolution on a display surface;
   display, in a second mode, a second image based on the image data converted to second resolution smaller than the first resolution at a second display size corresponding to second resolution, on the display surface;
   convert, when the operation key or the remote control signal receiver accepts an operation of increasing the second display size in the second mode, the first resolution of the image data to third resolution corresponding to the operation; and
   display a third image based on the image data having the third resolution on the display surface, wherein
   the second mode allows a user to use a pen on the display surface, and
the operation of increasing the second display size is provided by the user's action with the pen on the display surface.

* * * * *